Figure 1:
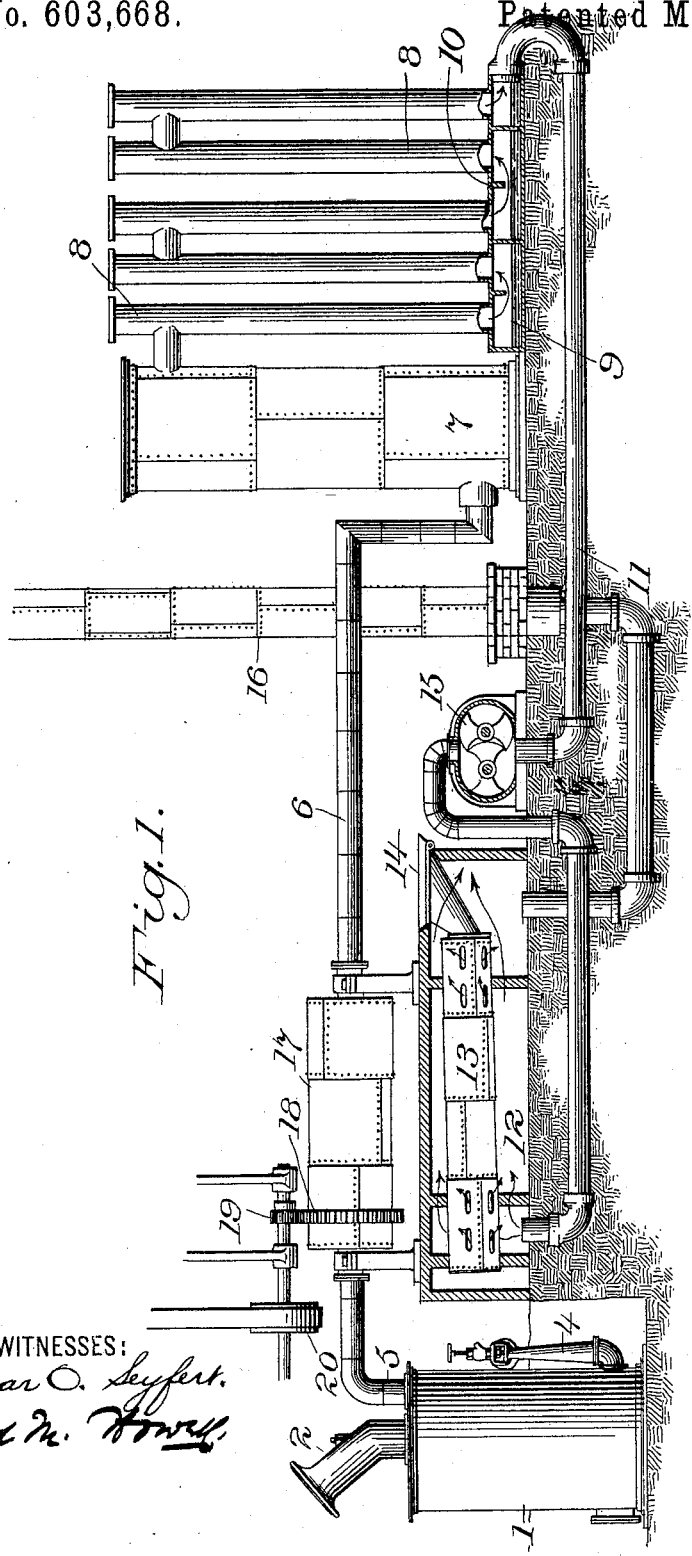

(No Model.) 2 Sheets—Sheet 1.

J. B. TAYLOR & H. V. WALKER.
PROCESS OF AND APPARATUS FOR RECOVERING AMMONIA AND WASTE PRODUCTS FROM GARBAGE.

No. 603,668. Patented May 10, 1898.

WITNESSES:
Oscar O. Seyfert.
Geo. M. Howell.

INVENTORS
Joseph B. Taylor
Henry V. Walker
BY
H. S. Mackaye
ATTORNEY

THE NORRIS PETERS CO., PHOTO-LITHO., WASHINGTON, D. C.

(No Model.) 2 Sheets—Sheet 2.

J. B. TAYLOR & H. V. WALKER.
PROCESS OF AND APPARATUS FOR RECOVERING AMMONIA AND WASTE PRODUCTS FROM GARBAGE.

No. 603,668. Patented May 10, 1898.

WITNESSES:
Oscar O. Seyfert.
Lloyd N. Howell.

INVENTORS.
Joseph B. Taylor
Henry V. Walker
BY
J. H. MacKaye
ATTORNEY

UNITED STATES PATENT OFFICE.

JOSEPH B. TAYLOR AND HENRY V. WALKER, OF BROOKLYN, NEW YORK.

PROCESS OF AND APPARATUS FOR RECOVERING AMMONIA AND WASTE PRODUCTS FROM GARBAGE.

SPECIFICATION forming part of Letters Patent No. 603,668, dated May 10, 1898.

Application filed August 23, 1897. Serial No. 649,278. (No model.)

*To all whom it may concern:*

Be it known that we, JOSEPH B. TAYLOR and HENRY V. WALKER, citizens of the United States, residing in the city of Brooklyn, county of Kings, and State of New York, have invented a certain new and useful Improvement in Methods of and Means for Garbage and Refuse Disposal, of which the following is a specification.

Our invention has relation to a novel method and means for disposing of garbage or refuse. It is our object to accomplish this end in such a way that the maximum economy shall result, and that in many cases the disposal of refuse shall not only cease to be a source of expense, but shall actually become more or less profitable.

Hitherto the problem of garbage or refuse disposal has become one of the most important and difficult of those presented by the conditions of areas of dense population. As a matter of fact, the only solutions to this problem thus far practically used which do not involve a greater or less nuisance owing to unhealthful and disagreeable odors are a source of great expense to the communities using them.

Former attempts at the solution of the problem of garbage and refuse disposal may be classed under two heads: first, the process of cremation, wherein nothing is aimed at but the destruction of the offensive matter; second, the process of reduction or utilization, such as that wherein the refuse is subjected to treatment with steam or solvents, and the valuable constituents, such as grease and tankage, recovered. In this class of processes the recovery of valuable products is made the prime object, the proper and sanitary disposition of the refuse being made a subordinate consideration. Hence many of the reduction processes fail entirely to result in a final and effective disposition of the refuse or garbage so as to render it inoffensive.

In both of the classes of methods above enumerated certain difficulties have been found by experience to exist which it is the object of our invention to obviate. These are principally the giving off of ill-smelling products of a gaseous nature, which are often the seat of disease-germs, great expense and waste, and failure to render the mass treated inoffensive.

We have found by practical experience that our improved method of disposal combines the advantages of the two classes of methods heretofore employed and produces a much higher average economy than either.

One example of apparatus adapted to the practice of our method of disposal is shown in the accompanying drawings, wherein—

Figure 2:
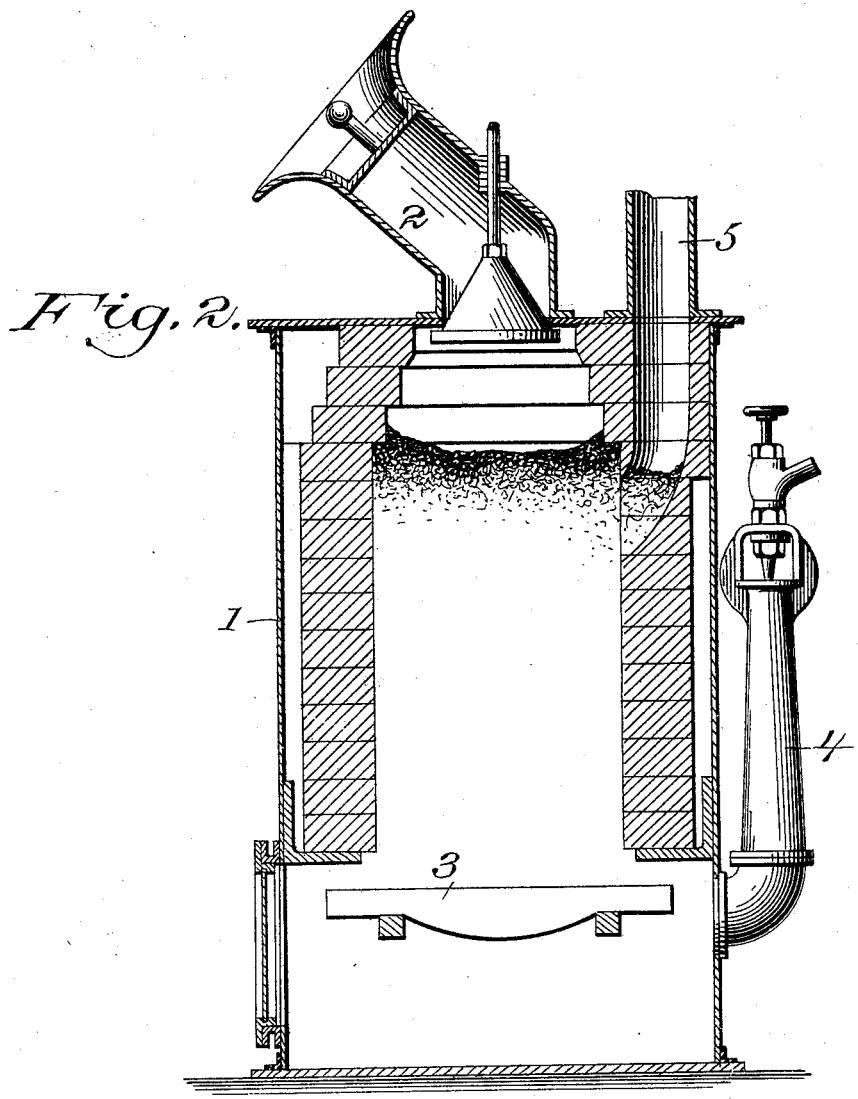

Figure 1 is a side elevation, partly in section, of a complete plant for the disposal of refuse by our system; and Fig. 2 is a vertical section of one form of furnace adapted to the plant in question.

Our method is akin to the cremation systems of disposal to the extent that at one stage of treatment the refuse is burned. This burning is so carried on, however, as to produce two valuable products, which we have found by experiment can be procured in paying quantities from garbage and city refuse by our system of treatment—namely, ammonia and combustible gas. We are also able to produce a certain amount of tar by this system; but we prefer to manage our material in such a manner as to decompose this tar in the furnace.

In pursuit of the ends just named the refuse after being properly dried, preferably in a manner detailed hereinafter, is placed in a furnace 1 in a thick layer, as shown, for instance, in Fig. 2. The form of this furnace may be indefinitely varied as long as it conforms to the requirements of gas-producers proper. The furnace shown in Fig. 2 is a well-known type of producer and is shown as an example of what is suitable for this purpose. The garbage which is introduced through the entrance 2 is heaped upon the grate-bars 3 in a thick layer, as shown in Fig. 2. A certain quantity of fuel may be mixed with the dried refuse in the furnace if it is desired for any reason to produce additional heat and power. The quantity of this fuel will depend to some extent upon the dryness and constituents of the garbage or refuse. These qualities vary with locality and season. Indeed, where the refuse is sufficiently combustible extra fuel may be entirely dispensed with.

In order to increase the percentage of valuable products, (ammonia and combustible gas,) we prefer to introduce under the garbage in the furnace a stream of steam and air by means of the piping, as shown at 4 in Fig. 2, for instance. The result of blowing the steam and air through the thick layer of burning material will be to decompose the water in the steam, forming carbon monoxid and liberating the hydrogen. The hydrogen will unite with nitrogen from certain nitrogenous constituents of the garbage to form the ammonia. The resulting products will be ammonia, carbon monoxid, and hydrocarbon gases, which will pass off through the pipe 5, preferably from a point below the top of the incandescent material, as shown in Fig. 2. This method of leading off these products is for the purpose of decomposing the tar which may have formed.

It is to be understood that our invention is not confined to the use of steam under the furnace 1. Simple air passing through the thick layer of incandescent refuse and fuel or refuse alone, as the case may be, will produce carbon monoxid, ammonia, and hydrocarbon gases, which may be utilized as hereinafter described. The thickness of the layer of material, as shown in the drawings, is merely illustrative, and any layer sufficiently deep to permit of the formation of the products named in utilizable quantities will be within the terms of our claims. The essential point in this connection is to supply enough fuel to insure practically complete reduction of the $CO_2$ first formed to $CO$.

The pipe 5 6 leads the heated gases from the furnace to a scrubber which we prefer to use. This scrubber is shown at 7. Here the gases are subjected to a washing action by a spray of falling water, as is well-known in scrubbers of this class. This prepares the gases for the successive stand-pipes of the condenser 8. Here the gases circulate in a manner made clear by the arrows in the liquor-receptacle 9 at the bottom of the condenser. As the gases pass down one condenser-pipe and up another around the partitions 10 they deposit upon the walls of the pipes the condensed ammonia liquor, which runs down into the receptacle 9 at the bottom. This ammonia liquor is made available for fertilizing purposes by being treated with sulfuric acid in a subsequent reaction, or, if desired, the gases may be treated with the acid in the form of a spray in the apparatus. After the treatment in the air or acid condenser for removal of the ammonia the gaseous products are led off by the pipe 11 and may be made available for fuel or lighting. As a rule we find it most expedient to burn this gas in a furnace 12, within which is placed a drying tank or receptacle 13, into which the garbage or refuse is fed by the hopper 14 or otherwise for drying before burning in the furnace 1. As shown in the figure, there are slots or openings supplied in the tank 13, whereby the hot gases of the drying-furnace may be allowed to circulate through the inside of the tank itself, and thus come in actual contact with the garbage or refuse. This actual contact may or may not be used, but is deemed preferable by us. The small arrows indicate the movement of the gas through the small openings in the side of the tank.

The power for causing the necessary movement of the gases through the system of piping, condensers, &c., above described may be supplied in a variety of ways, and the inward pressure of the steam and air under the garbage in the burning furnace will be found an aid in this matter; but our preferred agent for this purpose is an exhausting apparatus at the exit end of the system—such, for instance, as the Root exhaust, (illustrated in section at 15.) We prefer to locate this device in the position shown, wherein it may draw the gases comparatively cool through the system of piping and condenser by suction and force them forward through the drying-furnace, where they are burned, and find their way up the chimney 16. Any leaks in the pipes behind the exhaust will thus merely admit air to the system and will not permit the escape of noisome odors into the atmosphere, as would probably occur if a plenum were employed for the purpose of forcing the gases through the pipes.

By burning the combustible gases in the drier the refuse is made to supply the heat necessary to do its own drying.

A further utilization of the thermal value of the refuse may be obtained by the use of another preferred detail of our invention. The carbon monoxid, which forms the main body of the combustible gas which reaches the furnace 12, in burning at this drier does not afford all of the heat units theoretically available in the carbon which it contains. A portion of this heat production takes place in the furnace 1 when the carbon is first combined with the oxygen of the air. In order to avail ourselves of this primary heat present in the gases as given off from the furnace and to effect in part the cooling necessary for the condensation of the ammonia, we interpose between the portions of pipe 5 and 6 the drum or receiver 17, which is preferably so mounted as to be revolved on an axis substantially coincident with that of the pipes. By means of the gears 18 19 and the pulley and belt 20 or their equivalents this drum may be so revolved as to agitate its contents. The preliminary drying is done in this drum 17. The garbage or refuse is placed in the drum, where, being agitated by the means above stated, its every part is exposed to the highly-heated gases given off by the furnace 1. The moisture is in large part carried off, together with the ill-smelling gases of the fresh garbage, through the pipes and condenser. The moisture is left in the condenser, and the noisome gases are burned at 12 by the combustible gases which reach that point from the furnace 1. In practice, therefore, three sections of the garbage would be under treatment at once, where all the details of our specific invention are employed. The most advanced section would be in the furnace 1, the next section would be under process of final drying at 13, and the next section would be preliminarily drying at 17.

It will be seen that by the use of the two driers 13 and 17 a maximum amount of the heat from the main furnace is rendered available and at the same time the odors in the fresh garbage are to a great extent carried away and burned at 12 before being manipulated within the works in the transfer to the drier 13. We do not, however, limit our invention to a system wherein the garbage is dried by its own gases either preliminarily or finally, as above explained, or both.

It is to be understood that the apparatus which is shown and described herein is simply illustrative of many possible forms adapted to the practice of our method of disposal and that many modifications thereof may be made without departing from the spirit of our invention. Furthermore, all the steps shown and described herein as parts of our process are not essential to our invention in its broad aspect. The gases, for instance, which are left after separation of ammonia may be employed for any purpose to which fuel-gas or illuminating-gas is applicable.

What we claim is—

1. The method of garbage or refuse disposal which consists in dividing the garbage or refuse into sections for successive treatment, drying one section and burning the same in a thick layer in the presence of a supply of air, leading off the resulting products, burning the combustible portion of said products in the presence of the next successive section, for drying the same, and repeating this cycle with further sections in succession.

2. The method of garbage or refuse disposal which consists in dividing the garbage or refuse into sections for successive treatment, drying one section and burning the same in a thick layer, leading off the resulting products, dividing the ammonia from the combustible gases in said products, burning said combustible gases after separation of ammonia in the presence of the next successive section, for drying the same, and repeating this cycle with further sections successively.

3. The method of garbage or refuse disposal which consists in dividing the garbage or refuse into sections for successive treatment, drying one section and burning the same in a thick layer, leading off the resulting products over another section of the garbage for preliminary drying, dividing the ammonia and moisture from the combustible gases in said products, burning said combustible gases in the presence of another section of the garbage or refuse, for final drying and repeating this cycle with further sections, successively.

4. A gas-producer, a preliminary drier, means for leading the gas from the producer to said preliminary drier, a condenser for separating the ammonia and moisture from said gas, a final drier, and means for burning said gas after passing through said condenser near said final drier.

5. A gas-producer, a preliminary drier, means for leading the gas from the producer through said drier, means for agitating the contents of said drier, a condenser for separating ammonia and moisture from said gas, a final drier and means for burning said gas after passing through said condenser near said final drier.

6. A gas-producer, a preliminary drier, means for rotating the latter, cooling-chambers for separation of ammonia, a final drier and furnace around the same; in combination with pipes leading from said producer through said preliminary drier and ammonia-separator to said final drying-furnace, and a suction device for drawing the gases through a portion of their total path.

JOSEPH B. TAYLOR.
HENRY V. WALKER.

Witnesses:
HARRY THOMAS,
HAROLD S. MACKAYE.